March 10, 1936.  G. A. SCHETTLER  2,033,154

MACHINE FOR OPERATING UPON HIDES, SKINS, AND LEATHER

Filed Feb. 15, 1935  2 Sheets-Sheet 1

Inventor
Gustav A. Schettler
By his Attorney
Victor Cobb

March 10, 1936.  G. A. SCHETTLER  2,033,154
MACHINE FOR OPERATING UPON HIDES, SKINS, AND LEATHER
Filed Feb. 15, 1935  2 Sheets-Sheet 2

Inventor
Gustav A. Schettler
By his attorney
Victor Cobb

UNITED STATES PATENT OFFICE 2,033,154

MACHINE FOR OPERATING UPON HIDES, SKINS, AND LEATHER

Gustav A. Schettler, Leeds, England, assignor to The Turner Tanning Machinery Company, Portland, Maine, a corporation of Maine Application February 15, 1935, Serial No. 6,726
In Great Britain May 4, 1934

18 Claims. (Cl. 149—16)

This invention relates to machines for operating upon hides, skins, and leather. While the invention is illustrated as embodied in a machine for performing shaving operations upon skins and other light leathers, it is to be understood that the invention and various important features thereof may have other applications and uses.

This invention is an improvement upon that disclosed and claimed in United States application Serial No. 742,769, filed September 5, 1934, in the name of Gustav A. Schettler, wherein special means was provided for positioning a work support and bladed tool selectively at different distances with respect to each other to accommodate work pieces of substantially different grades of thicknesses. It is an object of this invention to provide for a more accurate adjustment to the requirements of the work of machines of the class referred to than has heretofore been considered practicable. More particularly, it is an object of this invention to provide for adjustment of the position of the work support by the operator, to accommodate various thicknesses of work, without changing to any substantial degree the pressure at which the work is presented to the tool, thereby to secure substantial uniformity in the pressure at which the work is treated irrespective of variations in the thickness of the work. Another object of the invention is to facilitate manual adjustment of the pressure at which work treating operations are performed. It is a still further object of the invention to provide an usually simple yet durable and efficient construction for performing the different adjustments mentioned without sacrificing any of the advantages of prior constructions.

To these ends and in accordance with an important feature of the invention, means is provided, in a machine for operating upon pieces of work, for effecting manual adjustment of the position of a work support with respect to a tool while maintaining substantially unchanged the pressure at which the work support backs the work against the thrust of the tool. In this way, the pressure at which shaving operations, for example, are performed may be maintained substantially uniform despite the fact that the work support may be selectively spaced at different distances with respect to the tool to accommodate a wide range of variations in the thickness dimensions of pieces of work. Conveniently the work support positioning means and the means for pressing the work support toward the tool both include endwise movable members having connections with a manually operable member which may be readily manipulated by the operator to secure simultaneous adjustments of said endwise movable members by which the pressure at which various operations on pieces of work are performed is maintained substantially uniform in spite of adjustments to accommodate variations in the thickness of the work.

In the illustrated construction, the work support positioning means comprise axially movable screw-threaded stop members adapted to engage abutments upon the machine frame, and the means for exerting pressure upon the work support in the direction of movement of the latter toward the tool comprises spring means, by which said pressure is yielding applied, and also an axially movable screw-threaded member to vary the tension of said spring means. For operating all of these screw-threaded members, there is preferably provided a rotary shaft, since the connections between said screw-threaded members and the rotary shaft may be of the simplest kind. Conveniently the said shaft carries a hand wheel located in a readily accessible position at the front of the machine, thus making it easy for the operator to secure the described adjustments.

Another feature of importance resides in the provision of manually operable means, located high up on the front of the machine in a position accessible to the operator, for facilitating adjustment of the yielding pressure at which a work support backs the work against the thrust of a tool during work treating operations. This makes it possible for the operator to vary instantly the pressure at which the work is treated so that it is not necessary to stop the machine to make adjustments to suit variations in the thickness dimensions or other characteristics of a given piece of work.

In the illustrated construction, the work support is mounted at the upper end of a carrier pivoted between its ends, and the means for applying pressure to the work support is found in a toggle mechanism backed by spring means, the toggle mechanism being connected to the lower end of the carrier by means comprising a screw-threaded member axially movable in the lower end of said carrier. For securing adjustment between the carrier and said toggle mechanism, an interiorly screw-threaded sleeve upon said screw-threaded member is provided with connections to a manually operable member, located near the upper end of said carrier in a position readily accessible to the operator, by which said screw-threaded member may be axially adjusted to vary the connection between said carrier and the toggle mechanism whereby the pressure of said spring means upon the work support may be instantly controlled to suit variations in the thickness of the work.

These and other important features of the invention and novel combinations of parts will now be described in detail in the specification and then pointed out more particularly in the appended claims.

Figure 2:
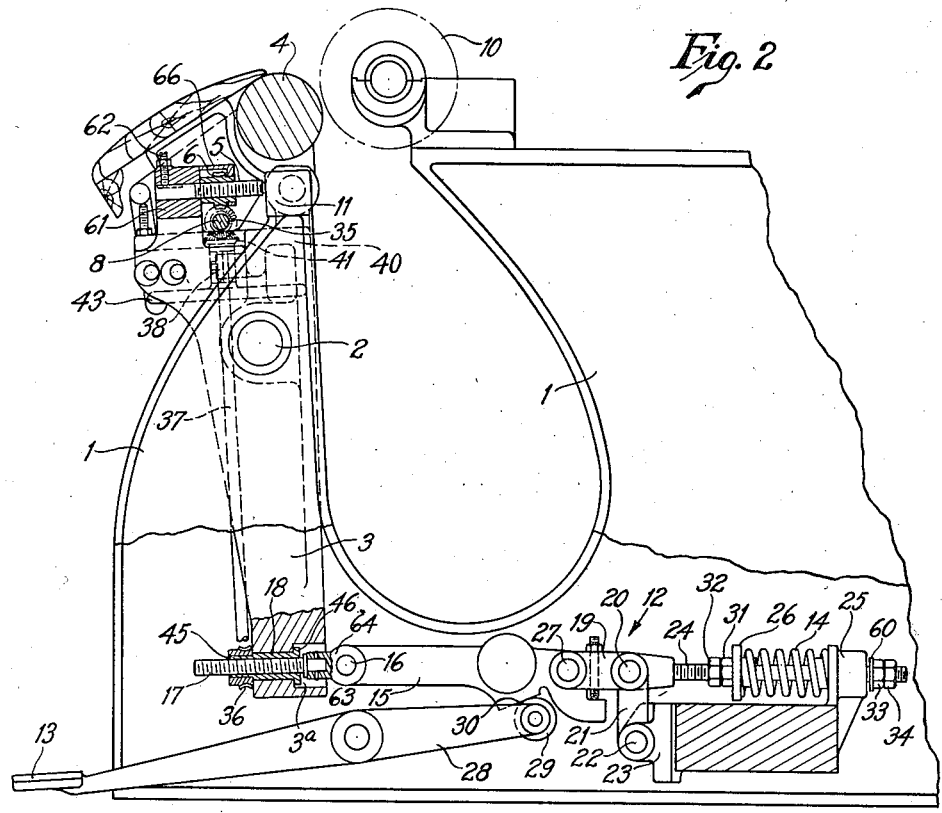
Fig. 2 is a side elevation, partly in section, of the machine shown in Fig. 1.

In the illustrated machine, which is particularly designed to perform shaving operations upon hides, skins, and leather, there is a main frame which consists of spaced side members 1 connected by a rigid round bar or shaft 2 on which is pivotally mounted a forked or substantially V-shaped frame 3 constituting a rocking carrier for a work supporting member or bed roll 4.

The forked or V-shaped carrier 3 has in each of its arms, above the pivot bar 2, an endwise movable member or adjustable screw 5. In the construction shown in Figs. 1 and 2, each screw passes through a worm wheel 6 housed on one of the aforesaid arms and arranged in mesh with a worm 7 on the adjacent end of a spindle 8 rotatably mounted in bearings 9 on the arms of the carrier so as to extend between the arms and in parallel relation to the rigid bar or shaft 2. The screws 5 are arranged at right angles to the worm spindle 8 so as to project towards the spaced side members 1 of the main frame and in the direction of the rotary tool 10 which is of the usual cylindrical type. The side members 1 of the machine frame are formed with corresponding bosses 11 at the top of each side member. The arrangement is such that, by turning the worm spindle 8, the axially movable members or screws 5 can be moved backwards or forwards in the carrier 3 in order to determine selectively the limit of movement of the carrier 3 towards the tool 10 by contact of the adjustable members 5 with the bosses 11, as shown in Figure 1.

Figure 1:
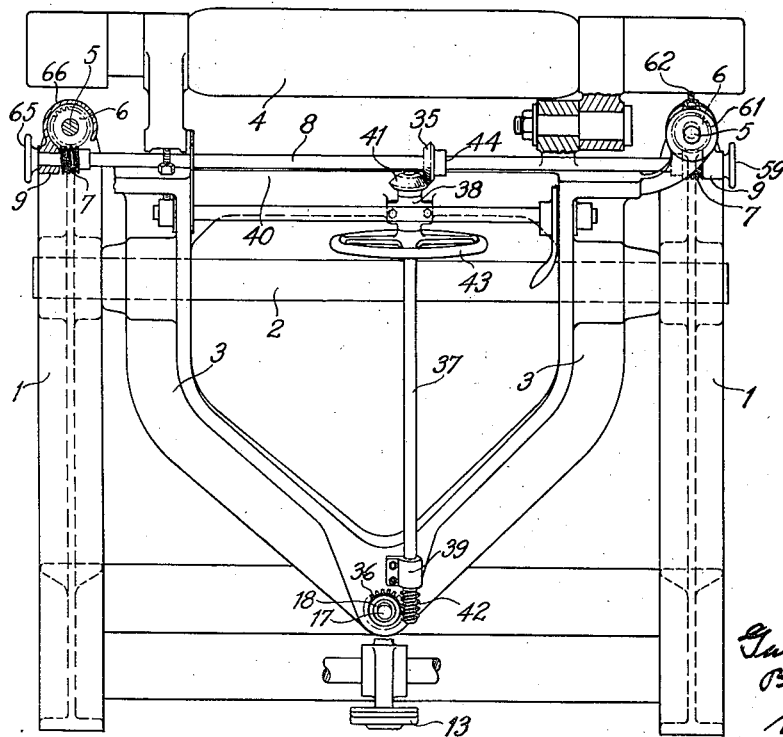
Fig. 1 is a front elevation, partly in section, of a shaving machine illustrating one embodiment of the invention.

Referring to Figs. 1 to 4, inclusive, for moving the rocking carrier 3 up to the abutments or stops 11, there is provided a spring controlled toggle device 12, and a treadle 13 arranged so that upon depression thereof the toggle is straightened (see Fig. 1). A spring 14 exerts pressure through the toggle device to hold the carrier 3 up to the stops 11, and, perforce, the bed roller 4 in operative position with respect to the tool 10 when the latter is operating upon a piece of work. To this end, one link 15 of the toggle device is pivotally connected with the rocking carrier 3 at the lower end of the latter by means of a pin 16, an adjusting axially movable screw 17, and a nut 18 in the form of a screwed sleeve. The other link 19 of the toggle is pivotally connected at 20 to a link 21, pivoted at 22 on a fixed bracket 23, and to a rod 24 slidable through a fixed guide 25 and surrounded by the compression spring 14 which is interposed between the said guide 25 and a collar 26 on the said rod 24. The links 15 and 19 are pivotally joined by a pin 27.

The treadle 13 consists of a two-armed lever one arm 28 of which extends under the toggle device 12 and is fitted with a roller 29 for contact with an inclined surface 30 on the link 15 adjacent to the pivot joint 27. Normally the toggle is bent so that when the treadle is depressed the arm carrying the roller 29 is raised, thereby straightening the toggle; the roller runs on the incline 30 as the toggle is straightened and bent. Means are provided for initially applying pressure to the spring 14. As shown, a nut 31 and a lock nut 32 are provided for adjustment on the spring rod 24 in association with the collar 26. For effecting substantial thickness reduction of a piece of work to a predetermined extent this spring is regulated so that considerable pressure is exerted upon the work. A nut 33 backed by a lock nut 34 is provided on the rod 24 to prevent the spring 14 from expanding completely when the toggle 12 is bent.

According to the example of the invention shown in Figs. 1 and 2, for effecting simultaneous adjustment of the axially movable members or stop screws 5 and of the aforesaid pressure applying means (comprising the toggle device 12 and the spring 14), an adjusting arrangement utilizing mitre and worm gearing is provided on the rocking carrier 3 between the worm spindle 8 and the nut or sleeve 18 and having operating connections with said spindle and sleeve. This arrangement comprises a bevel gear 35 mounted on the worm spindle 8, a worm wheel 36 mounted on the screwed sleeve 18 in the lower end of the carrier 3, a shaft 37 mounted on the carrier 3 at right angles to the pivot bar 2 in bearings 38, 39, one of which is attached to a bridge piece 40 extending horizontally between the two arms of the carrier 3, the other bearing 39 being attached to the base of the carrier at the juncture of the arms thereof, a bevel gear 41 at the upper end of the shaft 37, a worm 42 at the lower end of the shaft 37, and a hand wheel 43 on said shaft. As shown, the shaft 37 is mounted adjacent and parallel to the vertical median line of the carrier 3 with the bevel gear 41 in mesh with the gear 35 on the spindle 8, and with the worm 42 in mesh with the worm wheel 36 on the sleeve 18. The hand wheel 43 is fixedly mounted on the shaft 37 with its rim between the bridge piece 40 and the pivot bar 2. The bevel gear 35 is slidably keyed on the spindle 8 so as to enable it to be disengaged from the bevel gear 41 for purposes hereinafter described, and is fixed in its normal or operative position by a screw 44. The worm wheel 36 is fixed on the sleeve 18 by means of a screw 45. The screwed sleeve or nut 18 is freely rotatable in the carrier 3 but is prevented from axial movement therein by the worm wheel 36, which makes contact with the outer face of the carrier, and by a flange 46 thereon which makes contact with the bottom of a recess 3a in the carrier. Consequently when the sleeve 18 is rotated, the screw-threaded member 17 is moved axially in one direction or the other in said sleeve. Thus by turning the hand wheel 43 in one direction or the other the axially movable stop screws 5 and the axially movable screw 17 are adjusted simultaneously.

Figure 3:
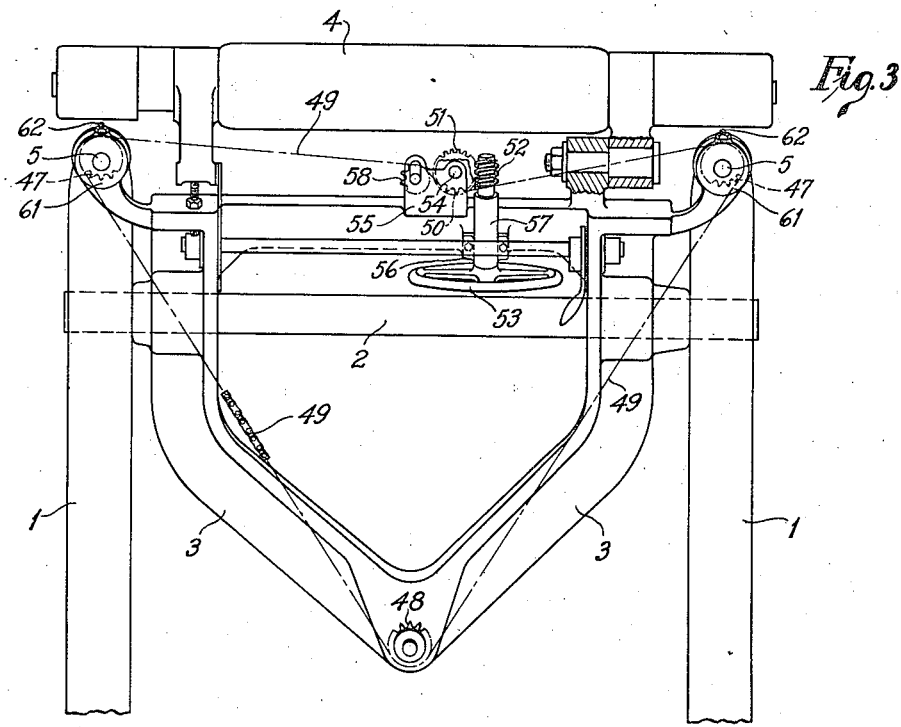
Fig. 3 is a front elevation of a shaving machine similar to that shown in Fig. 1 but with alternative adjusting means applied.
Figure 4:
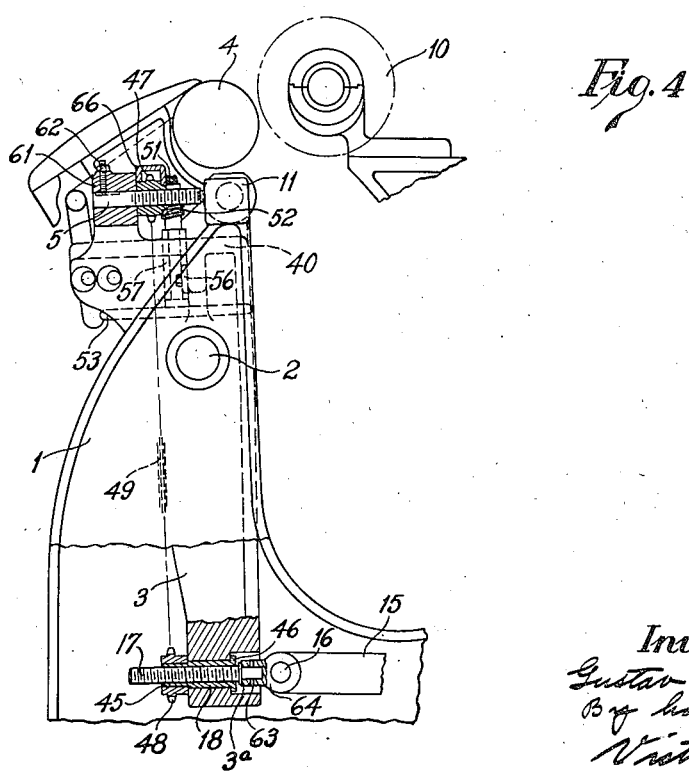
Fig. 4 is a side elevation, partly in section, of the front portion of the machine shown in Fig. 3, including the bed roller frame or carrier and the associated adjusting means.

In the modification shown in Figs. 3 and 4, a manually operable chain and sprocket gearing is utilized as the common adjusting arrangement for the axially movable stop screws 5 and screw 17, the worm wheels 6 and spindle 8 being dispensed with. As illustrated, sprocket wheels 47 are secured to the screws 5, and a sprocket wheel 48 is fixedly attached to the screw 17. An endless chain 49 is passed round these sprockets, and for operating the chain there is provided a sprocket 50 and worm gearing 51, 52 operable by a hand wheel 53. The sprocket 50 and worm wheel 51 are mounted on a spindle 54 carried by a bearing 55 on the bridge piece 40. The worm 52 and hand wheel 53 are mounted on a spindle 56 mounted, at right angles to the spindle 54, in a bearing 57 also on the bridge piece 40. A chain tensioning sprocket 58 may be adjustably mounted on the bearing 55. In this construction and arrangement also, when the hand wheel 53 is turned in one direction or the other the screws 5 and 17 are simultaneously adjusted accordingly.

In either of the combinations particularly described, when once the stop screws 5 have been initially adjusted and the requisite degree of pressure has been applied to the spring 14 by means of the nuts 31 and 33, subsequent adjustments can be made solely by operating the hand wheel 43 or 53 as the case may be, so that when it is necessary to adjust the stop screws 5 to compensate for wear of the tool 10, or for the purpose of enabling pieces of work of various thicknesses to be shaved, adjustment of the screw 17 is effected at the same time in such a manner that the tension of the spring 14 is maintained at substantially its original working pressure when the bed roller is moved to the operative position.

The screws 5 are slidably mounted in bearings 61 on the arms of the carrier 3 and are prevented from rotation by screws 62 furnished with lock nuts, said screws being inserted in the bearings so as to enter grooves in the screws. The screw 17 is prevented from rotation in the sleeve or nut 18 by a cotter pin 63 whereby the screw is connected to an eye piece 64 which receives the pin 16.

A locking hand wheel 65 or equivalent is provided on the spindle 8 for securing the screws 5 in position after adjustment.

As will be understood the worm wheels 6, or the sprockets 47, as the case may be, are prevented from axial movement by the bearings 61 and the housings 66, each of which is conveniently formed with the adjacent bearing 9.

In a machine wherein the positioning means for the bed roll and the pressure applying means for said roll are located on opposite sides of the pivot of the rocking frame or carrier of the bed roll, as shown in the drawings, the arrangement is, of course, such that adjustments of the positioning means and the pressure applying means are effected in opposite directions, in order to achieve the desired result. This is because the part of the frame or carrier on the opposite side of the pivot to the positioning means takes up a position further outwards or inwards than previously—depending on the adjustment of the positioning means—when the bed roll is moved into the selected operative position. For instance, in the example shown in the drawing, if the axially movable members or stop screws 5 are adjusted in an outward direction to enable the bed roll to take up an operative position nearer the tool, the lower part of the carrier 3 takes up a position correspondingly further outwards than previously, and accordingly the axially movable member or screw 17 is adjusted in the opposite i. e. in an inward direction so that the toggle device assumes the same positions as before whereby the pressure exerted by the spring 14 remains substantially the same. The adjustment of the axially movable members or screws 5 and 17 in opposite directions depends, of course, on the direction of rotation of the worm or sprocket wheels thereon and the character of their threads. Thus if the arrangement is such that said wheels rotate in the same direction while being adjusted, the screw 17 will be of the opposite character to the screws 5; that is to say, if the screws 5 are right hand the screw 17 will be left hand, and vice versa.

When the machine is adjusted for the purpose of reducing a piece of work to a given thickness and the bed roller 4 is moved to the operative position determined by the stop screws 5, the rod 24 is pushed through the guide 25 so that the spring 14 is further compressed and the nut 33 is moved away from the guide 25, so that the pressure on the work is exerted solely by the spring 14.

Referring again to Fig. 1, as has already been pointed out, the bevel gear 35 is slidably keyed on the spindle 8. This is to enable it to be disengaged from the bevel gear 41 so that the screws 5 can be initially adjusted according to requirements, and, if desired, suitable independent adjustment of the screw 17 may be made before the connection between the screws is established. This provision, more over, enables the machine to be converted from a machine for performing thickness reducing operations to a machine adapted to perform light shaving or cleaning operations. For this purpose the bevel gear 35 is rendered inoperative, and, by existing means comprising another hand wheel 59 (Fig. 1), the spindle 8 is rotated so that the stop screws 5 are screwed back to a position in which they avoid contact with the bosses 11 altogether. The nuts 31, 32 are also adjusted to make the spring 14 more flexible so that it exerts only a light pressure. The adjustment of the bed roller for action upon pieces of work of various thicknesses is then effected by means of the hand wheel 43 or 53 and the intermediate means. During the operation of the machine in this condition a washer 60 on the rod 24 makes contact with the guide 25 so that the nut 33 acts as a stop for the bed roll 4. When a piece of work is passed between the tool 10 and the bed roll 4, the spring 14 yields to the substance of the work so as to enable the tool to operate lightly thereon. For very light work the spring 14 can be replaced by a lighter spring. Accordingly with the improved arrangement it is possible to obtain results for which previously machines of two different types were necessary, and furthermore, the results obtained are not dependent upon the skill of the operator. Provision may be made in the chain and sprocket arrangement shown in Figs. 3 and 4 whereby the same objects can be achieved.

Having fully described my invention, what I claim as new and desire to secure by Letters Patent of the United States is:

1. In a machine for operating upon pieces of work, a tool, a work support to support work against the thrust of the tool, adjustable means to position the work support relatively to the tool to accommodate different thicknesses of work, means arranged to hold the work support yieldingly in said position, and means to enable the operator to effect manual adjustment of the work support positioning means and simultaneously therewith of the yielding holding means for the work support, whereby the yielding pressure under which the work is held to the tool is maintained substantially uniform while the positioning means is adjusted to secure proper treatment of different thicknesses of work by the tool.

2. In a machine for operating upon pieces of work, a tool, a work support movable to present work to the tool, adjustable members to position the work support relatively to the tool to accommodate different thicknesses of work, means arranged to move the work support between work receiving and work presenting positions with respect to the tool, said means comprising means yieldingly holding the work support in work presenting position relative to the tool, and a manually operable member having connections with said positioning members and with said yielding holding means for the work support to effect adjustment thereof, whereby the yielding pressure at which the work support holds the work against the tool may be maintained substantially uniform while the positioning members are adjusted to secure proper treatment of different thicknesses of work by the tool.

3. In a machine for operating upon pieces of work, a rotary tool, a work support to back a piece of work against the thrust of the tool, positioning members adjustable to hold the work support at selected distances from the tool to accommodate different thicknesses of work, abutments on the machine frame, means yieldingly pressing the work support toward the tool and said positioning members against said abutments, an adjustable member to vary the pressure of said yielding pressing means with respect to said work support, and a single manually operable member having connections with the positioning members and with said adjustable member to enable the operator to adjust the position of the work support with respect to the tool while maintaining substantially uniform the pressure at which said work support supports the work against the thrust of the tool.

4. In a machine for operating upon pieces of work, a rotary tool, a bed roll movable to present a piece of work to the rotary tool, adjustable means to position the bed roll relatively to the tool to accommodate different thicknesses of work, means arranged to hold the bed roll yieldingly in work presenting position with respect to said rotary tool, and means under the control of the operator to adjust the bed roll positioning means and simultaneously therewith the yielding holding means for the bed roll, whereby the yielding pressure under which the work is held to the tool is maintained substantially uniform while the positioning means may be adjusted to various selected positions relative to the tool to secure proper treatment of different thicknesses of work by the rotary tool.

5. In a machine for operating upon pieces of work, a work support to back a piece of work against the thrust of the tool, axially movable members adjustable to position the work support selectively in spaced relation to the tool to accommodate various thicknesses of work, means arranged to hold the work support yieldingly against the thrust of the tool, said means comprising spring means and a member axially movable to change the tension of said spring means, and a manually operable member to adjust the axially movable work support positioning members and simultaneously therewith to adjust the axially movable member associated with the yielding holding means for the work support, whereby the yielding pressure under which the work support is held in work presenting position is maintained substantially uniform while the work support is positioned selectively in different positions so that different pieces of work or different portions of the same piece of work having substantial differences in their thickness dimensions may receive proper treatment at substantially uniform pressure.

6. In a machine for operating upon pieces of work, a tool, a work support, a carrier for the work support pivoted between its ends and movable to carry the work support between work receiving and work presenting positions with respect to the tool, adjustable screw-threaded members mounted on the carrier above the pivot point of the latter to position the work support selectively in relation to the tool to accommodate different thicknesses of work, means to move the carrier and work support between work receiving and work presenting positions with respect to the tool, said means being connected to the carrier below its pivot point and comprising spring means to exert yielding pressure on said carrier by which the work support is yieldingly pressed toward the tool, a screw-threaded member forming a connection between the carrier and said spring means, said screw-threaded member being screw threaded in a direction the reverse of that of the screw-threaded positioning members, and a manually operable member having operative connections with all said screw-threaded members, whereby the screw-threaded positioning members above the pivot of the carrier are operated to move in a reverse direction to the screw-threaded member of the yielding means below the pivot of said carrier so that the yielding pressure at which the work support holds the work against the tool may be maintained substantially uniform while the positioning means is adjusted to secure proper treatment of different thicknesses of work by the tool.

7. In a machine for operating upon hides, skins, and leather, a tool, a work support movable to present a hide, skin or piece of leather to the tool, abutments on the machine frame, means to engage said abutments and adjustable to position the work support selectively in various spaced relations to the tool to accommodate different thicknesses of work, means arranged to hold the work support yieldingly in work presenting position with respect to said tool, and a manually operable member having connections with said positioning means and with said yielding holding means for the work support simultaneously to adjust the same, whereby the pressure at which the work support holds the work yieldingly against the tool may be maintained substantially uniform while the positioning means is adjusted to secure proper presentation of pieces of work of different thicknesses or of different thickness portions of the same piece of work.

8. In a machine for operating upon hides, skins, and leather, a rotary tool, a work support to back a hide, skin or piece of leather against the thrust of the tool during operation of the latter, positioning members adjustable to hold the work support selectively at various distances from the tool, means to move the work support between work receiving and work presenting positions with respect to said tool, said means comprising spring means for yieldingly pressing the work support against the thrust of the tool, said spring means comprising an adjustable member to vary the pressure of the work support against the thrust of the tool, and a single manually operable member having connections with the positioning members and with said adjustable member of the yielding pressing means to enable the operator to adjust all said members simultaneously, whereby the pressure at which said work support supports the work against the thrust of the tool is maintained substantially uniform despite the fact that the position of the work support with respect to the tool is varied to accommodate varying characteristics in the work undergoing treatment.

9. In a machine for operating upon hides, skins, and leather, a rotary tool, a bed roll movable between work receiving and work presenting positions with respect to said tool, positioning members adjustable to hold the bed roll at selected distances from the tool to accommodate different thicknesses of work, means to move the bed roll relatively to the tool, said means comprising spring means yieldingly pressing the bed roll toward tthe tool, an adjustable member to vary the pressure of said spring means against said bed roll, and a single manually operable member having connections with the positioning members and with said adjustable member to enable the operator to adjust the position of the bed roll with respect to the tool while maintaining substantially uniform the pressure at which said bed roll supports the work against the thrust of the tool.

10. In a machine for operating upon hides, skins, and leather, a rotary tool, a bed roll to back a piece of work against the thrust of the tool, abutments on the machine frame, axially movable members arranged to engage said abutments and adjustable to position the bed roll selectively in spaced relation to the tool to accommodate various thicknesses of work, means to move the bed roll between work receiving and work presenting positions with respect to said tool, said means comprising spring means and a member axially movable to change the tension of said spring means, and a manually operable member to adjust the bed roll positioning members and simultaneously therewith to adjust the axially movable member associated with said spring means, whereby the yielding pressure under which the bed roll is held in work presenting position is maintained substantially uniform while the bed roll is positioned selectively in different positions so that hides, skins or leather of different thicknesses or different portions of the same piece of work having substantial differences in their thickness dimensions may receive proper treatment at substantially uniform pressure.

11. In a machine for performing cutting operations upon hides, skins, and leather, a rotary cutter, a bed roll movable between work receiving and work presenting positions with respect to said cutter, a carrier for the bed roll, positioning members mounted on the carrier and adjustable selectively to limit the movement of the bed roll toward the tool, means to move the carrier and to hold it yieldingly with the bed roll in work presenting position, and means under control of the operator for simultaneously adjusting the positioning members and also the means which holds the carrier yieldingly in work presenting position, so that the pressure at which the bed roll is held in work presenting position may be maintained substantially uniform despite adjustment of the positioning members to accommodate differences in the thicknesses of the work pieces.

12. In a machine for performing cutting operations upon hides, skins, and leather, a rotary cutter, a bed roll movable between work receiving and work presenting positions with respect to said cutter, a carrier for the bed roll, positioning members mounted on the carrier and adjustable selectively to limit the movement of the bed roll toward the tool, means to move the carrier and to hold it yieldingly with the bed roll in work presenting position, said means comprising a spring, an extensible member connecting said moving means to said carrier, whereby the pressure of said spring on the carrier may be adjusted, and a manually operable member located at the front of the machine in a position readily accessible to the operator and having connections with said positioning members and with said extensible member so that said manually operable member may be manipulated to adjust simultaneously said positioning members and the length of said extensible member to maintain substantially uniform the pressure at which the bed roll presents the work to the cutter while the bed roll is adjusted to accommodate different thicknesses of work.

13. In a machine for performing cutting operations upon hides, skins, and leather, a rotary cutter, a bed roll movable between work receiving and work presenting positions with respect to said cutter, a carrier for the bed roll, screw-threaded axially movable positioning members mounted on the carrier and adjustable selectively to limit the movement of the bed roll toward the tool, interiorly screw-threaded members on said positioning members to adjust the latter, means to move the carrier and the bed roll between said work receiving and work presenting positions, said means comprising spring means operative to determine the pressure at which the bed roll presents the work to the cutter, an axially movable screw-threaded member connected to said spring means, an interiorly threaded member on the last-mentioned axially movable member to adjust the latter and perforce the tension of said spring means, and a manually operable member having connections to all said interiorly screw-threaded members for simultaneously adjusting them, whereby the pressure at which the bed roll supports the work against the thrust of the cutter may be maintained substantially uniform despite adjustments of said positioning members.

14. In a machine for performing cutting operations upon hides, skins, and leather, a rotary cutter, a bed roll movable between work receiving and work presenting positions with respect to said cutter, a carrier for the bed roll pivoted between its ends on a horizontal axis, positioning members mounted on the upper end of the carrier and adjustable selectively to limit the movement of the bed roll toward the tool, means connected to the lower end of the carrier to move the latter and the bed roll between said work receiving and work presenting positions, said moving means comprising spring means operative to determine the pressure at which the bed roll presents the work to the cutter, a shaft mounted vertically upon said carrier at the front of the machine and having a manually operable member secured thereto, and connections between the upper end of said shaft and the positioning members and between the lower end of said shaft and said spring means, whereby upon manipulation of said manually operable member both the positioning members and the spring means are adjusted simultaneously to change the position of the bed roll and to maintain substantially uniform the pressure at which the bed roll presents the work to the cutter.

15. In a machine for performing cutting operations upon hides, skins, and leather, a rotary cutter, a bed roll movable between work receiving and work presenting positions with respect to said cutter, a carrier for the bed roll, positioning members mounted on the carrier and adjustable selectively to limit the movement of the bed roll toward the tool, means to move the carrier between work receiving and work presenting position, said means comprising spring means operative to determine the pressure at which the bed roll presents the work to the cutter, said positioning members and said spring means having screw-threaded members operable to adjust said positioning members and said spring means, and a manually operable member having connections to adjust said screw-threaded members, whereby the pressure at which the bed roll is held in work presenting positions with respect to the cutter may be maintained substantially uniform during adjustment of said positioning members.

16. In a machine for performing cutting operations upon hides, skins, and leather, a rotary cutter, a bed roll, a carrier for the bed roll pivoted between its ends and movable to carry the bed roll between work receiving and work presenting positions relatively to the cutter, positioning members mounted on the carrier above its pivotal point, means having connections with said carrier below its pivot point to operate the carrier and the bed roll between work receiving and work presenting positions, said means comprising spring means tensioned to hold the bed roll with a yielding pressure against the thrust of the cutter, said positioning members and said carrier operating means each comprising axially movable members having screw-threaded members associated therewith to adjust said axially movable members, and a manually operable member having connections with said screw-threaded members to operate the same whereby said positioning members may be adjusted to position the bed roll selectively at various distances from the cutter and whereby the tension of said yielding means may be maintained substantially uniform in spite of the adjustment of said positioning members.

17. In a machine for treating hides, skins, and leather, a rotary tool, a bed roll, a carrier for the bed roll pivoted between its ends on a horizontal axis, means connected to the carrier below its pivot point to move said carrier and bed roll between work receiving and work presenting positions, said moving means for the carrier comprising spring means arranged to exert pressure upon the lower end of the carrier whereby the bed roll is held with a yielding pressure toward the rotary tool, and a manually operable member mounted high up on the front of the machine in a position readily accessible to the operator and having connections to adjust the tension of said spring means.

18. In a machine for treating hides, skins, and leather, a rotary tool, a bed roll, a carrier arranged to have the bed roll mounted in the upper end thereof, said carrier being pivoted between its ends on a horizontal axis, means connected to the carrier below its pivot point to move said carrier and bed roll between work receiving and work presenting positions, said moving means for the carrier comprising spring means arranged to exert pressure upon the lower end of the carrier whereby the bed roll at the upper end of the carrier is held with a yielding pressure toward the rotary tool, said moving means for the carrier comprising a screw-threaded member mounted in the lower end of the carrier, an internally screw-threaded member associated with said screw-threaded member mounted in the carrier and said internally screw-threaded member being held against all movement except a rotary movement whereby said first-mentioned screw-threaded member is caused to move axially upon rotation of the internally screw-threaded member, and a manually operable member mounted on the carrier near the upper end thereof and having connections with the internally screw-threaded member thereby to control the pressure exerted by said spring means on said carrier and bed roll.

GUSTAV A. SCHETTLER.